United States Patent
Jeong et al.

(10) Patent No.: US 11,544,051 B2
(45) Date of Patent: Jan. 3, 2023

(54) VEHICLE UPDATE SYSTEM AND METHOD

(71) Applicants: Hyundai Motor Company, Seoul (KR); Kia Motors Corporation, Seoul (KR)

(72) Inventors: Hyeok Sang Jeong, Gyeonggi-do (KR); Jae Hoon Lee, Seoul (KR); Yoon Sik Jung, Seoul (KR); Dong Youl Lee, Seoul (KR); Myeong Gyu Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/101,288

(22) Filed: Nov. 23, 2020

(65) Prior Publication Data
US 2021/0382707 A1 Dec. 9, 2021

(30) Foreign Application Priority Data

Jun. 5, 2020 (KR) .......................... 10-2020-0068396

(51) Int. Cl.
*G06F 9/445* (2018.01)
*G06F 8/65* (2018.01)

(52) U.S. Cl.
CPC ...................................... *G06F 8/65* (2013.01)

(58) Field of Classification Search
CPC ........................................................ G06F 8/65
USPC ................................................. 717/168–178
See application file for complete search history.

(56) References Cited

U.S. PATENT DOCUMENTS

2020/0264864 A1 * 8/2020 Yang .......................... H04L 9/30
2020/0334033 A1 * 10/2020 Lee ............................ G07C 5/08

* cited by examiner

*Primary Examiner* — Chuck O Kendall
(74) *Attorney, Agent, or Firm* — Fox Rothschild LLP (57) ABSTRACT

A vehicle update system includes a server that determines whether a new version of data is present based on an update version of and a final update-failed version of a vehicle controller, and transmits the new version of the data when the new version of the data is present. An update controller executes an update of the vehicle controller based on the new version of the data received from the server, and determines a processing method of the data according to whether the update of the vehicle controller is successful.

8 Claims, 5 Drawing Sheets

VEHICLE UPDATE SYSTEM AND METHOD

CROSS-REFERENCE TO RELATED APPLICATION

This application claims the benefit of priority to Korean Patent Application No. 10-2020-0068396, filed on Jun. 5, 2017, the entire contents of which are incorporated herein by reference.

TECHNICAL FIELD

The present disclosure relates to a vehicle update system and method, and more particularly, to a vehicle update system and method that minimizes wireless communication data usage and executes over-the-air updates.

BACKGROUND

Recently, a vehicle system is connected to a communication network and a plurality of vehicle controllers installed within a vehicle may receive data (firmware) from an over-the-air (OTA) server and perform updates based thereon. The vehicle controllers may repeatedly perform an operation of requesting download of data from the OTA server and downloading the data whenever an update fails with the received data since the vehicle controllers may experience a situation in which integrity of ROM data may be damaged when the update fails with the received data, causing an excessive increase in cost of wireless communication data. Accordingly, there is a need to develop a technology capable of minimizing wireless communication data usage in an OTA update process of receiving data from the OTA server and updating the vehicle controllers.

SUMMARY

The present disclosure provides a vehicle update system and method capable of minimizing wireless communication data usage and executing OTA update. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle update system may include a server configured to determine whether a new version of data is present based on an update version of and a final update-failed version of a vehicle controller, and transmit the new version of the data when the new version of the data is present and an update controller configured to execute an update of the vehicle controller based on the new version of the data received from the server, and determine a processing method of the data according to whether the update of the vehicle controller is successful.

The server may be configured to determine whether the new version is the final update-failed version in response to determining that the new version of the data is present, and determine that the new version is absent in response to determining that the new version is the final update-failed version. The server may be configured to determine that the new version is present in response to determining that the new version is not the final update-failed version.

The update controller may include a communication device configured to receive the new version of the data from the server, an execution device configured to execute the update of the vehicle controller when the new version of the data is received, and a processor configured to determine whether the update of the vehicle controller is successful. The processor may be configured to convert the new version of the data to rollback data in response to determining that the update of the vehicle controller is successful.

The processor may be configured to execute the update again a predetermined number of retries in response to determining that the update of the vehicle controller is not successful. The processor may be configured to rollback when the update is again executed the predetermined number of retries. The processor may be configured to execute the rollback and determine whether the rollback is successful, and in response to determining that the rollback is not successful and execute the rollback a predetermined number of rollbacks. The processor may be configured to subtract one from a number of travels when the rollback is successful or the rollback has been executed the predetermined number of rollbacks. The processor may be configured to delete the new version of data received when a remaining number of travels is zero and set the new version of the data as the final update-failed version.

According an aspect, a vehicle update method may include determining whether a new version of data is present based on an update version of and a final update-failed version of a vehicle controller, transmitting the new version of the data when the new version of the data is present, and executing an update of the vehicle controller based on the new version of the data, and determining a processing method of the data according to whether the update of the vehicle controller is successful.

The vehicle update method may further include determining whether the new version is the final update-failed version in response to determining that the new version of the data is present, and determining that the new version is absent in response to determining that the new version is the final update-failed version. The method may further include determining that the new version is present in response to determining that the new version is not the final update-failed version.

The vehicle update method may further include converting the new version of the data to rollback data in response to determining that the update of the vehicle controller is successful. The vehicle update method may further include executing the update again a predetermined number of retries when it is determined that the update of the vehicle controller is not successful and executing rollback when the update is again executed the predetermined number of retries.

Additionally, the vehicle update method may include executing the rollback, determining whether the rollback is successful, and when the rollback is not successful, executing the rollback a predetermined number of rollbacks. The vehicle update method may include subtracting one from a number of travels when the rollback is successful or the rollback has been executed the predetermined number of rollbacks and deleting the new version of the data received when a remaining number of travels is zero after the subtraction and setting the new version of the data as the final update-failed version.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
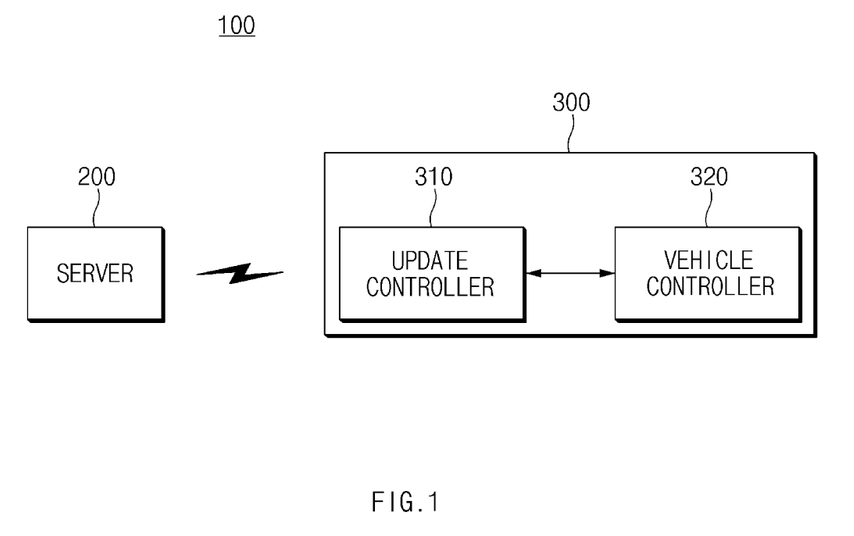
FIG. 1 is a configuration diagram showing a configuration of a vehicle update system according to an exemplary embodiment of the present disclosure.

FIG. 1 is a configuration diagram showing a configuration of a vehicle update system according to an exemplary embodiment of the present disclosure. Referring to FIG. 1, a vehicle update system 100 may include a server 200 and a vehicle 300. In particular, the vehicle 300 may include an update controller 310 and a vehicle controller 320 connected via an in-vehicle network. A detailed description of the update controller 310 will be provided with reference to FIG. 2.

The server 200 may be configured to provide data (e.g., firmware) in an over-the-air (OTA) manner, and determine whether a new version of the data is present when receiving an updated version of the vehicle controller 320 and a final update-failed version (Finalgiveup) of the vehicle controller 320 is received. Particularly, the new version of the data may refer to data including new information capable of updating existing information.

In response to determining that the new version of the data is present, the server 200 may be configured to determine whether the new version is the final update-failed version of the vehicle controller received from the update controller 310. When the server 200 determines that the new version of the data is the final update-failed version of the vehicle controller received from the update controller 310, the server 200 may be configured to determine that a new version of data is absent, and inform the update controller 310 that the new version of data is absent. On the other hand, when the server 200 determines that the new version of the data is not the final update-failed version of the vehicle controller received from the update controller 310, the server 200 may be configured to determine that the new version of the data is present, and inform the update controller 310 that the new version is present. Thereafter, when the server 200 receives a request to download the new version of the data from the update controller 310, the server 200 may be configured to transmit the new version of the data to the update controller 310.

Figure 2:
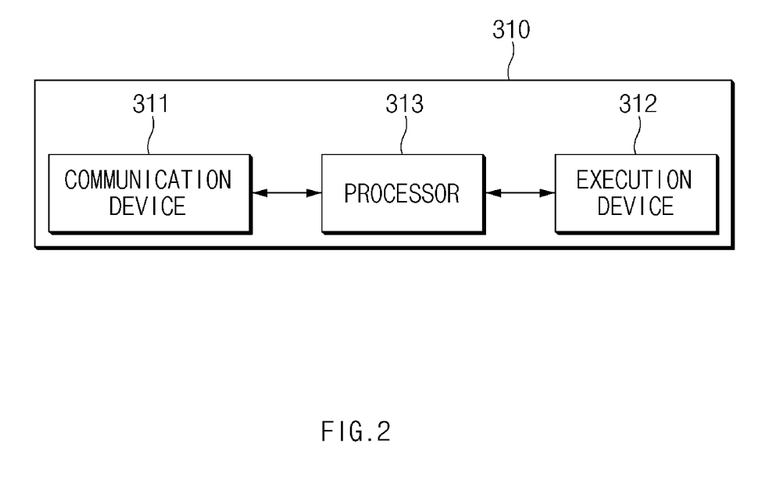
FIG. 2 is a configuration diagram showing a configuration of an update controller according to an exemplary embodiment of the present disclosure.

FIG. 2 is a configuration diagram showing a configuration of an update controller according to an exemplary embodiment of the present disclosure. Referring to FIG. 2, the update controller 310 may include a communication device 311, an execution device 312, and a processor 313.

The communication device 311 may be configured to perform wireless communication with the server 200 via various wireless communication methods including, for example, Wi-Fi, WiBro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LTE). According to an exemplary embodiment, the communication device 311 may be configured to receive the new version of the data from the server 200.

The execution device 312 may be configured to transmit the new version of the data to the vehicle controller 320 under the control of the processor 313 to execute update, and receive an update result from the vehicle controller 320 to transmit the update result to the processor 313. The processor 313 may be configured to execute the overall operation of the update controller 310 according to an exemplary embodiment of the present disclosure. Specifically, the update controller 310 may be configured to execute the update of the vehicle controller 320 based on the new version of the data received from the server 200, and determine a data processing method according to whether the update of the vehicle controller 320 is successful.

According to an exemplary embodiment, when the communication device 311 receives the new version of the data from the server 200, the processor 313 may allow the update controller 310 to store the new version of the data, obtain the user's approval for execution of the update, determine a vehicle status and verify the integrity of the new version of the data. The processor 313 may be configured to determine the number of times the vehicle has traveled after the vehicle controller 320 has been updated to the previous version based on the vehicle status.

When the integrity of the new version of the data received from the server 200 is verified, the processor 313 may be configured to request the execution device 312 to execute the update of the vehicle controller 320. In addition, when the execution device 312 receives an update result from the vehicle controller 320 after executing the update of the vehicle controller 320, the processor 313 may be configured to determine whether the update of the vehicle controller is successful based on the update result received by the execution device 312, when the update result is received from the vehicle controller 320. In response to determining that the update of the vehicle controller 320 is successful, the processor 313 may be configured to convert the new version of the data into rollback data. On the other hand, in response to determining that the update of the vehicle controller is not successful, the processor 313 may be configured to execute the update again a predetermined number of retries.

According to an exemplary embodiment, the processor 313 may be configured to subtract one from the predetermined number of retries whenever the update fails, when the predetermined number of retries is zero, determine that the update is executed again as many times as the predetermined number of retries and in this case, execute rollback. In particular, the rollback may refer to an operation of restoring to the existing data, and it may be determined to roll back the vehicle controller 320 with pre-stored rollback data (e.g., the previous version of the data).

The processor 313 may be configured to request the execution device 312 to execute the rollback of the vehicle controller 320 using the pre-stored rollback data. In addition, when the execution device 312 receives an update result from the vehicle controller 320 after executing the rollback of the vehicle controller 320 using the pre-stored rollback data, the processor 313 may be configured to determine whether the rollback of the vehicle controller is successful based on a rollback result received by the execution device 312 when the rollback result is received from the vehicle controller 320.

In response to determining that the rollback of the vehicle controller 320 is not successful, the processor 313 may be configured to execute the rollback a predetermined number of rollbacks. According to an exemplary embodiment, the processor 313 may be configured to subtract one from the predetermined number of rollbacks whenever the rollback fails, and determine that the rollback has executed as many as the predetermined number of rollbacks when the predetermined number of rollbacks is zero. In response to determining that the rollback is successful or the rollback has been executed the predetermined number of the rollbacks, the processor 313 may be configured to subtract one from a predetermined number of travels.

The processor 313 may be configured to determine whether a predetermined time of travels is zero, and when the predetermined time of travels is zero, determine that the update to the new version of the data has failed although retry of the update and rollback have been executed the number of travels, delete the received new version of the data, and set the new version of the data as the final update-failed version. On the other hand, in response to determining that the predetermined number of travels is not zero, the processor 313 may be configured to again execute the update the remaining number of times of travels and repeatedly perform a series of processes of executing the rollback. Accordingly, the processor 313 may be configured to continuously attempt the update while preventing the data from being downloaded again whenever the update fails, preventing excessive data cost due to downloading.

The vehicle controller 320 may be implemented by various processing devices such as a microprocessor incorporating a semiconductor chip or the like capable of operating or executing various instructions, and may include a processor configured to electronically operate various devices of the vehicle, and according to an exemplary embodiment, the vehicle controller 320 may include an electric control unit (ECU) requiring update.

Figure 3:
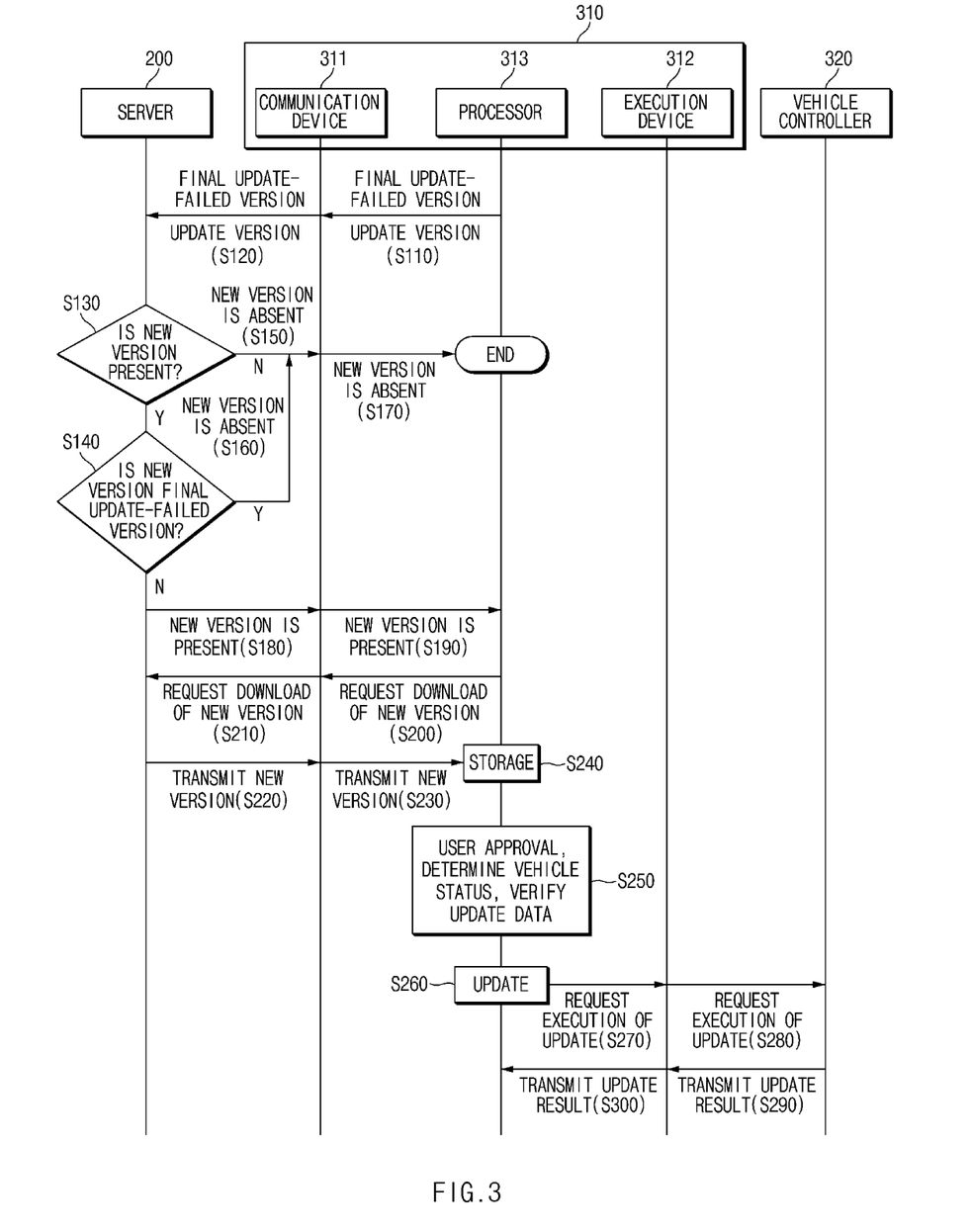
FIG. 3 is a diagram showing a vehicle update method according to an exemplary embodiment of the present disclosure.

FIG. 3 is a view showing a vehicle update method according to an exemplary embodiment of the present disclosure. Referring to FIG. 3, the processor 313 may be configured to transmit the update version and the final update-failed version received from the vehicle controller 320 to the communication device 311 (S110). In addition, the communication device 311 may be configured to transmit the received update version and the final update-failed version received from the processor 313 to the server 200 (S120).

When the update version of the vehicle controller 320 and the final update-failed version (Finalgiveup) of the vehicle controller 320 are received from the update controller 310, the server 200 may be configured to determine whether a new version of the data for enabling the update of the vehicle controller 320 is present (S130). In particular, the new version of the data may refer to data including new information capable of updating existing information.

In response to determining that the new version of the data is present (Y), the server 200 may be configured to determine whether the new version is the final update failed version of the vehicle controller 320 received from the update controller 310 (S140). In S130, the server 200 may be configured to inform the communication device 311 that the new version is absent when the new version of the data is absent (N) (S150). In addition, in S140, when the server 200 determines that the new version of the data is the final update-failed version of the vehicle controller received from the update controller 310 (Y), the server 200 may be configured to determine that the new version of the data is absent, and inform the communication device 311 that the new version of the data is absent (S160). In addition, the communication device 311 may be configured to inform the processor 313 that the new version of the data is absent (S170).

On the other hand, in S140, when the server 200 determines that the new version of the data is not the final update-failed version of the vehicle controller received from the update controller 310 (N), the server 200 may be configured to determine that the new version of the data is present, and inform the communication device 311 that a new version is present (S180). Thereafter, the communication device 311 may be configured to inform the processor 313 that the new version of the data is present (S190).

In response to identifying that the new version of the data is present, the processor 313 may be configured to request the communication device 311 to download the new version of the data (S200). The communication device 311 may be configured to request the server 200 to download the new version of the data (S210). The server 200 may be configured to transmit the new version of the data to the communication device 311 (S220), and the communication device 311 may be configured to transmit the new version of the data received from the server 200 to the processor 313 (S230).

When receiving the new version of the data, the processor 313 may be configured to store the new version of the data (S240), obtain the user's approval for execution of the update, determine a vehicle status, and verify the integrity of the new version of the data (S250). In S250, the processor 313 may be configured to determine the number of times the vehicle has traveled after the vehicle controller 320 has been updated to the previous version based on the vehicle status.

When the integrity of the new version of the data received from the server 200 is verified, the processor 313 may be configured to determine the execution of the update and request the execution device 312 to execute the update of the vehicle controller 320 (S270). In addition, the execution device 312 may be configured to request execution of the update of the vehicle controller 320 (S280). The vehicle controller 320 may be configured to transmit the result of performing the update to the execution device 312 (S290), and the execution device 312 may be configured to transmit an update result received from the vehicle controller 320 to the processor 313. (S300).

Figure 4:
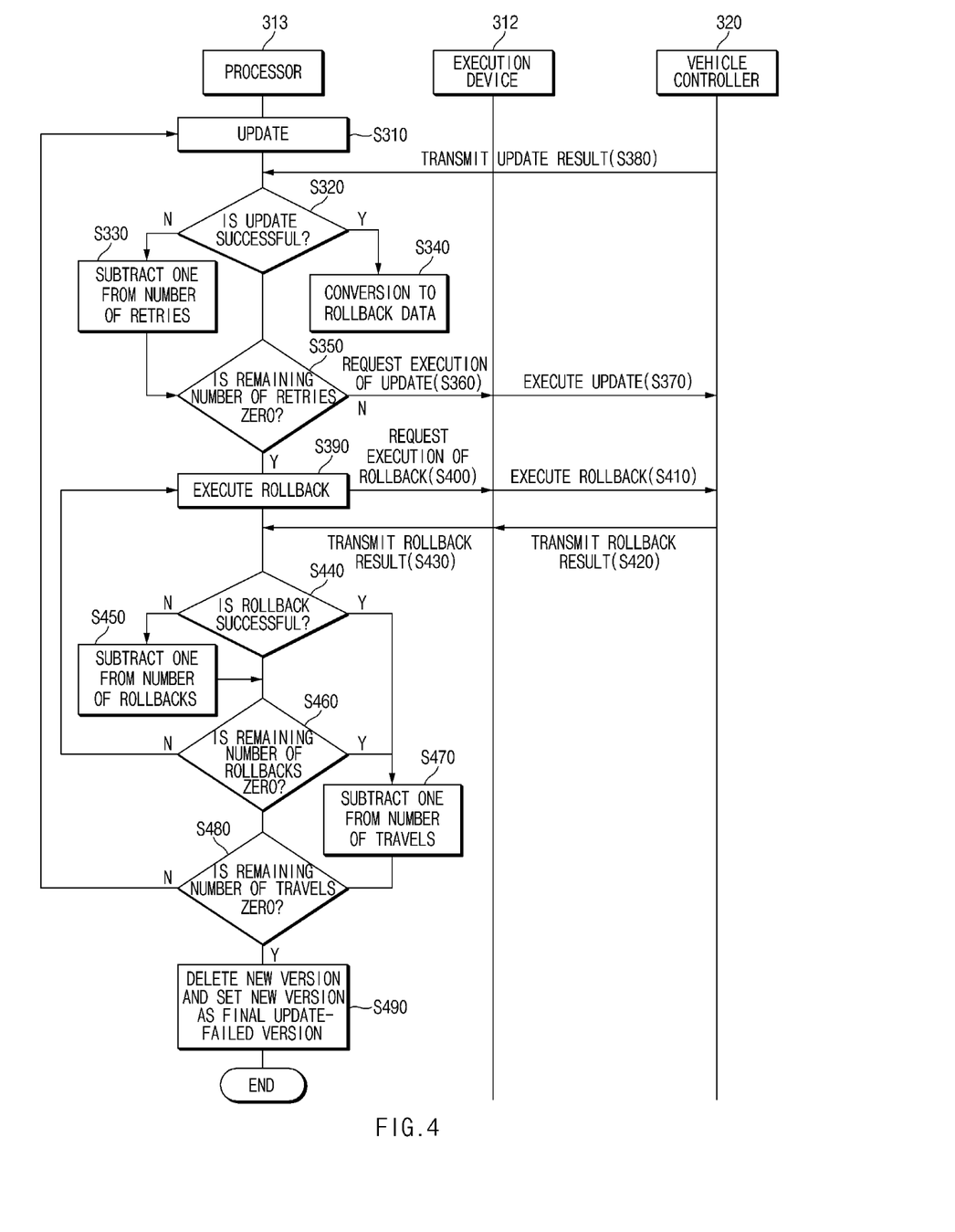
FIG. 4 is a diagram showing a vehicle update method performed according to an update result in an exemplary embodiment of the present disclosure.

FIG. 4 is a diagram showing a vehicle update method performed according to an update result in an exemplary embodiment of the present disclosure. Referring to FIG. 4, after executing the update (S310), the processor 313 may be configured to determine whether the update of the vehicle controller is successful based on the update result (S300 in FIG. 2) received by the execution device 312 (S320).

In response to determining in S320 that the update of the vehicle controller 320 is successful (Y), the processor 313 may be configured to convert the new version of the data into rollback data (S340). On the other hand, in S320, in response to determining that the update of the vehicle controller is not successful (N), the processor 313 may be configured to execute the update again a predetermined number of retries. According to an exemplary embodiment, the processor 313 may be configured to subtract one from a predetermined number of retries whenever the update is not successful (S330), and determine whether the remaining number of retries after the subtraction is zero (S350).

In response to determining in S350 that the remaining number of retries is not zero, the processor 313 may be configured to request the execution device 312 to execute the update (S360), and the execution device 312 may be configured to request the vehicle controller 320 to execute update the new version of the data (S370). The vehicle controller 320 may be configured to transmit an update result to the execution device 312, and the execution device 312 may be configured to transmit the update result to the processor 313 (S380). Thereafter, the processor 313 may be configured to repeatedly perform S320 to S380 until the remaining number of retries is zero after the subtraction, and execute rollback when the remaining number of retries is zero after the update is performed the predetermined number of retries and the subtraction is executed on the predetermined number of retries in S350 (S390). In S390, the rollback may refer to an operation of restoring to the existing data, and it may be determined to roll back the vehicle controller 320 with pre-stored rollback data (e.g., the previous version of the data).

The processor 313 may be configured to request the execution device 312 to execute the rollback of the vehicle controller 320 using the pre-stored rollback data (S400). In addition, the processor 313 may be configured to request the execution device 312 to execute the rollback of the vehicle controller 320 using the pre-stored rollback data (S410). The vehicle controller 320 may be configured to transmit a rollback result to the execution device 312 (S420), and the execution device 312 may be configured to transmit the rollback result received from the vehicle controller 320 to the processor 313 (S430). The processor 313 may be configured to determine whether the rollback of the vehicle controller 320 is successful based on the rollback result received from the execution device 312 (S440).

In S440, the processor 313 may be configured to execute the rollback a predetermined number of rollbacks when the rollback of the vehicle controller 320 is not successful (N). According to an exemplary embodiment, the processor 313 may be configured to subtract one from a predetermined number of rollbacks whenever the rollback is not successful (S450), and determine whether the remaining number of rollbacks after the subtraction is zero (S460). In response to determining in S460 that the remaining number of rollbacks is not zero, the processor 313 may be configured to repeatedly perform operations of S390 to S450 and subtract one from the number of travels when the rollback is executed the predetermined of number of rollbacks and the number of rollbacks is zero after the subtraction (S470). Subsequently, the processor 313 may be configured to determine whether the remaining number of travels is zero after the subtraction (S480).

In response to determining in S480 that the remaining number of travels after the subtraction is not zero (N), operations of S310 to S470 may be repeatedly performed. Additionally, in response to determining in S480 that the remaining number of travels is zero after the subtraction, the processor 313 may be configured to determine that the update of the vehicle controller 320 using the new version of the data has failed even though update retry and rollback are executed the number of travels, delete the new version of the data received and set the new version of the data as the final update-failed version (S490).

Figure 5:
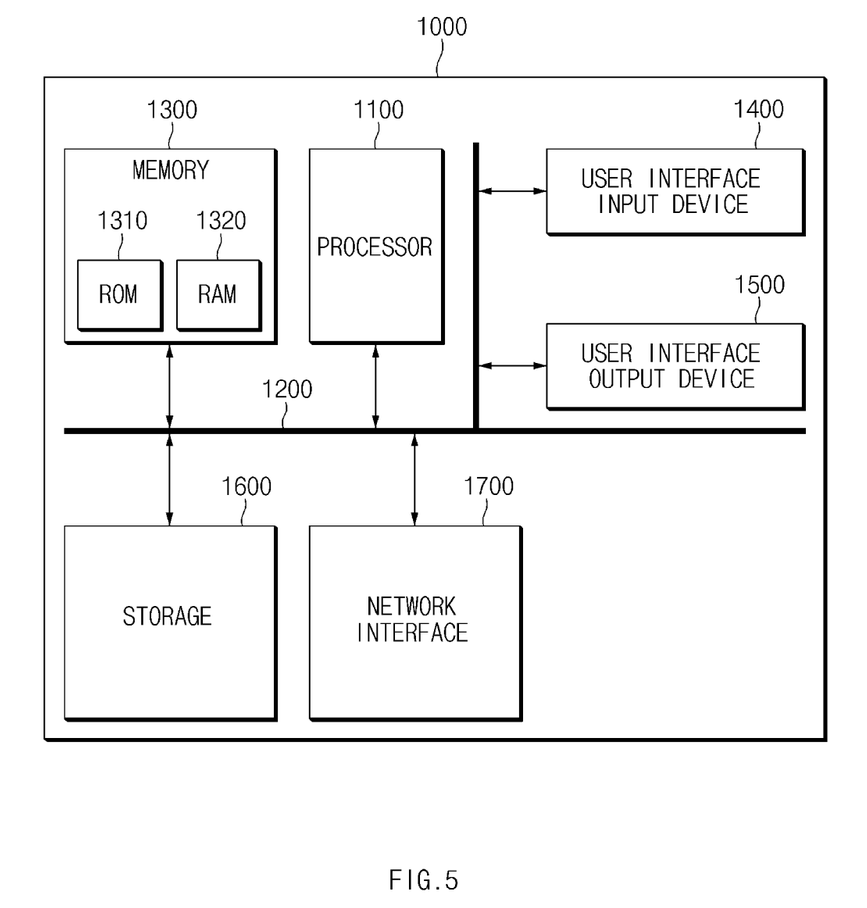
FIG. 5 a diagram showing a configuration of a computing system for executing a method according to an exemplary embodiment of the present disclosure.

FIG. 5 illustrates a configuration of a computing system for executing a method according to an exemplary embodiment of the present disclosure. Referring to FIG. 5, a computing system 1000 may include at least one processor 1100, a memory 1300, a user interface input device 1400, a user interface output device 1500, storage 1600, and a network interface 1700, which are connected with each other via a bus 1200. The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains. Therefore, the exemplary embodiments of the present disclosure are provided to explain the spirit and scope of the present disclosure, but not to limit them, so that the spirit and scope of the present disclosure is not limited by the exemplary embodiments. The scope of protection of the present disclosure should be interpreted by the following claims, and all technical ideas within the scope equivalent thereto should be construed as being included in the scope of the present disclosure.

According to the vehicle update system and method according to an exemplary embodiment of the present disclosure, it may be possible to prevent a version with a history of failed update from being downloaded again and unnecessary increase in data usage. In addition, the present disclosure may execute the update using an in-vehicle network, but repeatedly execute the update in the event of failure, thereby ensuring robustness of the update function. In addition, when the update is successful, update data may be used as rollback data of the next update, so that rollback data is not downloaded separately, thereby minimizing wireless data usage.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle update system comprising:
a server configured to determine whether a new version of data is present based on an update version of and a final update-failed version of a vehicle controller, and transmit the new version of the data when the new version of the data is present; and
an update processing device configured to execute an update of the vehicle controller based on the new version of the data received from the server, and determine a processing method of the data according to whether the update of the vehicle controller is successful,
wherein the update processing device includes
a communication device configured to receive the new version of the data from the server;
an execution device configured to execute the update of the vehicle controller when the new version of the data is received; and
a control device configured to determine whether the update of the vehicle controller is successful,
wherein the control device is configured to convert the new version of the data to rollback data when it is determined that the update of the vehicle controller is successful,
wherein the control device is configured to:
perform control to execute the update again a predetermined number of retries when it is determined that the update of the vehicle controller is not successful;
perform control to execute the rollback when the update is again executed the predetermined number of retries;
subtract one from a predetermined number of travels when the rollback has been executed the predetermined number of rollbacks; and
delete the new version of the data received when the predetermined number of travels is zero after subtracting, and set the new version of the data as the final update-failed version.

2. The vehicle update system of claim 1, wherein the server is configured to determine whether the new version is the final update-failed version when it is determined that the new version of the data is present, and determine that the new version is absent when it is determined that the new version is the final update-failed version.

3. The vehicle update system of claim 2, wherein the server is configured to determine that the new version is present when it is determined that the new version is not the final update-failed version.

4. The vehicle update system of claim 1, wherein the control device is configured to execute the rollback and determine whether the rollback is successful, and when the rollback is not successful and execute the rollback a predetermined number of rollbacks.

5. A vehicle update method comprising:
determining, by a server, whether a new version of data is present based on an update version of and a final update-failed version of a vehicle controller;
transmitting, by the server, the new version of the data when the new version of the data is present; and executing, by an update controller, an update of the vehicle controller based on the new version of the data, and determining, by the update controller, a processing method of the data according to whether the update of the vehicle controller is successful, converting, by the update controller, the new version of the data to rollback data when it is determined that the update of the vehicle controller is successful, wherein the update controller is configured to:

perform control to execute the update again a predetermined number of retries when it is determined that the update of the vehicle controller is not successful;

perform control to execute the rollback when the update is again executed the predetermined number of retries;

subtract one from a predetermined number of travels when the rollback has been executed the predetermined number of rollbacks; and delete the new version of the data received when the predetermined number of travels is zero after subtracting, and set the new version of the data as the final update-failed version.

6. The vehicle update method of claim 5, further comprising:

determining, by the server, whether the new version is the final update-failed version when it is determined that the new version of the data is present, and determining that the new version is absent when it is determined that the new version is the final update-failed version.

7. The vehicle update method of claim 6, further comprising:

determining, by the server, that the new version is present when it is determined that the new version is not the final update-failed version.

8. The vehicle update method of claim 5, further comprising:

executing, by the update controller, the rollback and determining whether the rollback is successful, and when the rollback is not successful, executing the rollback a predetermined number of rollbacks.

* * * * *